US010671432B2

(12) United States Patent
Hursh et al.

(10) Patent No.: US 10,671,432 B2
(45) Date of Patent: Jun. 2, 2020

(54) INTELLIGENT MEMORY MANAGEMENT THROUGH PEER LEARNING

(71) Applicant: International Business Machines Corporation, Armonk, NY (US)

(72) Inventors: Daniel M. Hursh, Saint Charles, MN (US); Jonathan L. Kaus, Rochester, MN (US); David M. Koster, Rochester, MN (US); Jason A. Nikolai, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 197 days.

(21) Appl. No.: 15/973,885

(22) Filed: May 8, 2018

(65) Prior Publication Data

US 2019/0347132 A1 Nov. 14, 2019

(51) Int. Cl.
*G06F 9/50* (2006.01)
*G06F 3/06* (2006.01)
*G06F 9/48* (2006.01)
*G06N 20/00* (2019.01)

(52) U.S. Cl.
CPC .......... *G06F 9/5016* (2013.01); *G06F 3/0604* (2013.01); *G06F 3/0631* (2013.01); *G06F 3/0664* (2013.01); *G06F 3/0673* (2013.01); *G06F 9/4843* (2013.01); *G06N 20/00* (2019.01)

(58) Field of Classification Search
CPC .................................................. G06F 9/5016
See application file for complete search history.

(56) References Cited

U.S. PATENT DOCUMENTS

2015/0169683 A1 6/2015 Chandramouli et al.
2016/0055043 A1 2/2016 Chikabelapur et al.

FOREIGN PATENT DOCUMENTS

WO 2017218277 A1 12/2017

OTHER PUBLICATIONS

"Copy-On-Write," https://en.wikipedia.org/wiki/Copy-on-write, 2017, pp. 1-4.
Greg Nakhimovsky, "Minimizing Memory Usage for Creating Application Subprocesses," http://www.oracle.com, May 2006, pp. 1-9.

*Primary Examiner* — Charlie Sun
(74) *Attorney, Agent, or Firm* — Robert A. Voigt, Jr.; Winstead PC (57) ABSTRACT

A method, system and computer program product for optimizing memory management. An analytics engine receives from a computing device an execution sequence that led to the detected execution of an operation to create a new process, which involves copying of the parent process. The analytics engine searches profiles stored in a repository for patterns of execution sequences that match the received execution sequence. Upon identifying a stored pattern with an execution sequence within a threshold degree of similarity as the received execution sequence, the analytics engine instructs the computing device to handle the operation to create the new process in a certain manner based on the contents of the profile containing the matching stored pattern. For example, the computing device may be instructed to preemptively fail the operation in response to the profile indicating that the execution of the operation resulted in an out of memory error.

20 Claims, 5 Drawing Sheets

… patterns of execution sequences along with their associated memory footprints in accordance with an embodiment of the present invention.

DETAILED DESCRIPTION

The present invention comprises a method, system and computer program product for optimizing memory management. In one embodiment of the present invention, an analytics engine receives from an analytics engine daemon of the operating system of a computing device an execution sequence that led to the detected execution of an operation to create a new process, which involves copying of the parent process. The analytics engine searches intelligent profiles stored in a repository for patterns that match the received execution sequence. Upon identifying a stored pattern within a threshold degree of similarity with the received execution sequence, the analytics engine determines whether the intelligent profile for the matching stored pattern indicates that the operation was executed successfully without an out of memory error. That is, a determination is made by the analytics engine as to whether the execution of such an operation is known to cause an over allocation of memory. If the intelligent profile indicates that the operation was executed successfully without an out of memory error, then the analytics engine instructs the computing device to perform the operation. If, however, the intelligent profile indicates that the operation was not executed successfully without an out of memory error, then the analytics engine instructs the computing device to pre-emptively block/fail the operation, or, alternatively, to proceed with performing the operation but to also allocate less than the entire memory address space of the parent process when performing the operation to create a new process. By preemptively failing the operation, the operating system of the computing system is prevented from improperly invoking the out of memory manager to terminate processes which should not be terminated. Furthermore, by allocating less than the entire memory address space of the parent process when performing the operation to create a new process, the risk of the operating system of the computing device improperly invoking the out of memory manager to terminate processes which should not be terminated is lessened.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

While the following discusses the present invention in connection with the fork( ) system call, the principles of the present invention may be applied to other operations that result in an out of memory error. A person of ordinary skill in the art would be capable of applying the principles of the present invention to such implementations. Further, embodiments applying the principles of the present invention to such implementations would fall within the scope of the present invention.

Figure 1:
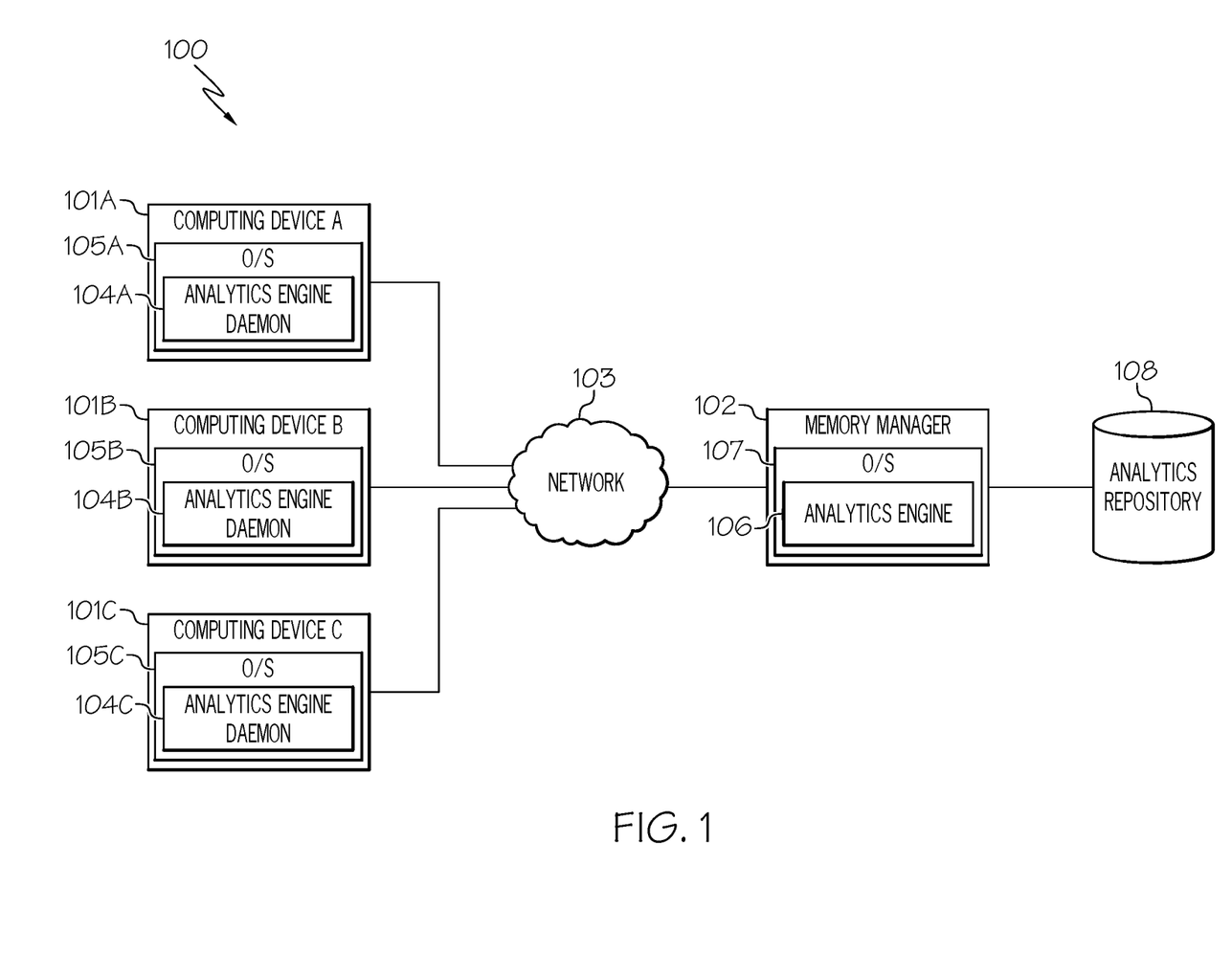

Referring now to the Figures in detail, FIG. 1 illustrates a communication system 100 for practicing the principles of the present invention in accordance with an embodiment of the present invention. Communication system 100 includes computing devices 101A-101C (identified as "Computing Device A," "Computing Device B," and "Computing Device C," respectively, in FIG. 1) connected to a memory manager 102 via a network 103. Computing devices 101A-101C may collectively or individually be referred to as computing devices 101 or computing device 101, respectively. The user of computing device 101 may also be referenced herein as user 101.

Computing device 101 may be any type of computing device (e.g., portable computing unit, mobile device, Personal Digital Assistant (PDA), smartphone, laptop computer, tablet personal computer, mobile phone, cellular phone, navigation device, gaming unit, desktop computer system, workstation, Internet appliance and the like) configured with the capability of connecting to network 103 and consequently communicating with other computing devices 101 and memory manager 102. A hardware configuration of computing device 101 is discussed below in connection with FIG. 2.

Memory manager 102 is configured to optimize memory management on computing devices 101 through peer learning. In particular, memory manager 102 is configured to avert situations where the operating system of computing device 101 improperly invokes the out of memory manager to terminate processes in computing device 101 in response to implementing a system call, such as a fork( ) system call that utilizes the copy-on-write system call. A hardware configuration of memory manager 102 is discussed below in connection with FIG. 3.

In connection with averting such situations, computing devices 101A-101C include an analytics engine daemon 104A-104C, respectively, in its operating system 105A-105C, respectively. Analytics engine daemon 104A-104C may collectively or individually be referred to as analytics engine daemons 104 or analytics engine daemon 104, respectively. Furthermore, operating systems 105A-105C may collectively or individually be referred to as operating systems 105 or operating system 105, respectively.

In one embodiment, analytics engine daemon 104 is configured to communicate anonymous process (e.g., execution sequence) and memory data (e.g., memory footprint) information to memory manager 102 which is used by memory manager 102 to establish intelligent profiles consisting of patterns of execution sequences along with its associated memory footprint (amount of memory that a program uses or references while running). In one embodiment, analytics engine daemon 104 is configured to monitor the execution sequence of a software program running on computing device 101 and detect the execution of operations, such as a system call to create a new process (e.g., fork( ) system call) that utilizes a copy-on-write system call. Such information may then be sent to memory manger 102 (analytics engine 106 discussed below).

In one embodiment, memory manager 102 includes an analytics engine 106 within its operating system 107. In one embodiment, analytics engine 106 is configured to optimize the memory management of computing devices 101 using the intelligent profiles consisting of patterns of execution sequences along with its associated memory footprint which are stored in a repository (analytics repository) 108 connected to memory manager 102. After establishing a sufficient number of patterns of execution sequences, analytics engine 106 is configured to search for stored patterns in repository 108 that match within a threshold degree of similarity to an execution sequence received from analytics engine daemon 104 in connection with an execution of an operation to create a new process, such as a parent process creating a copy of itself via the fork( ) system call. If there is a stored pattern that matches the received execution sequence within a threshold degree of similarity, then analytics engine 106 determines whether the intelligent profile for the matching stored pattern indicates that the operation was executed successfully without an out of memory error. That is, a determination is made by analytics engine 106 as to whether the execution of such an operation is known to cause an over allocation of memory. If the intelligent profile indicates that the operation was executed successfully without an out of memory error, then analytics engine 106 instructs computing device 101 to perform the operation. If, however, the intelligent profile indicates that the operation was not executed successfully without an out of memory error, then analytics engine 106 instructs computing device 101 to preemptively block/fail the operation, or, alternatively, to proceed with performing the operation but to also allocate less than the entire memory address space of the parent process when performing the operation to create a new process. By preemptively failing the operation, operating system 105 of computing system 101 is prevented from improperly invoking the out of memory manager to terminate processes which should not be terminated. Furthermore, by allocating less than the entire memory address space of the parent process when performing the operation to create a new process, the risk of operating system 105 of computing device 101 improperly invoking the out of memory manager to terminate processes which should not be terminated, such as essential processes that are need to run operating system 105 of computing device 101, is lessened. As a result, the functionality and capability of computing device 101 is improved by preventing the termination of processes that should not be terminated, including essential processes that are needed to operate computing device 101.

System 100 is not to be limited in scope to any one particular network architecture. For example, analytics engine 106 may be a cloud based engine. Furthermore, system 100 may include any number of computing devices 101, memory managers 102, networks 103 and repositories 108. Furthermore, while FIG. 1 illustrates memory manager 102 as being a separate physical device, some or all of the functionality of memory manager 102, including analytics engine 106, as discussed herein, may reside in computing device 101.

Figure 2:
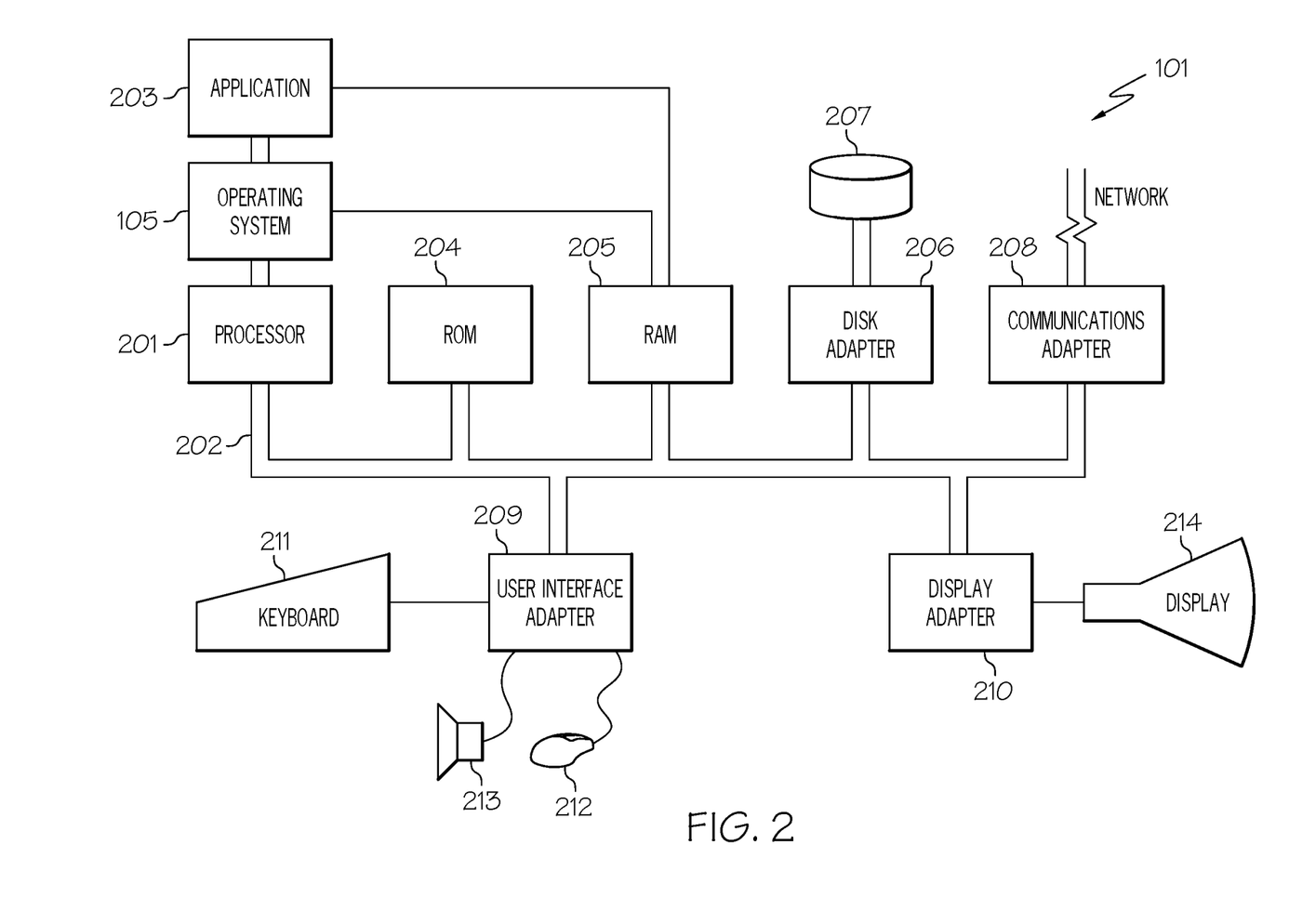

Referring now to FIG. 2 in conjunction with FIG. 1, FIG. 2 illustrates a hardware configuration of computing device 101 which is representative of a hardware environment for practicing the present invention. Referring to FIG. 2, computing device 101 has a processor 201 coupled to various other components by system bus 202. An operating system 105 runs on processor 201 and provides control and coordinates the functions of the various components of FIG. 2. An application 203 in accordance with the principles of the present invention runs in conjunction with operating system 105 and provides calls to operating system 105 where the calls implement the various functions or services to be performed by application 203. Application 203 may include, for example, analytics engine daemon 104 which is configured to monitor and collect process and memory data information as discussed further below in connection with FIGS. 4-5.

Referring again to FIG. 2, read-only memory ("ROM") 204 is coupled to system bus 202 and includes a basic input/output system ("BIOS") that controls certain basic functions of computing device 101. Random access memory ("RAM") 205 and disk adapter 206 are also coupled to system bus 202. It should be noted that software components including operating system 105 and application 203 may be loaded into RAM 205, which may be computing device's 101 main memory for execution. Disk adapter 206 may be an integrated drive electronics ("IDE") adapter that communicates with a disk unit 207, e.g., disk drive.

Computing device 101 may further include a communications adapter 208 coupled to bus 202. Communications adapter 208 interconnects bus 202 with an outside network (e.g., network 103 of FIG. 1) thereby enabling computing device 101 to communicate with other devices (e.g., computing device 101, memory manager 102).

I/O devices may also be connected to computing device 101 via a user interface adapter 209 and a display adapter 210. Keyboard 211, mouse 212 and speaker 213 may all be interconnected to bus 202 through user interface adapter 209. A display monitor 214 may be connected to system bus 202 by display adapter 210. In this manner, a user is capable of inputting to computing device 101 through keyboard 211 or mouse 212 and receiving output from computing device 101 via display 214 or speaker 213. Other input mechanisms may be used to input data to computing device 101 that are not shown in FIG. 2, such as display 214 having touch-screen capability and keyboard 211 being a virtual keyboard. Computing device 101 of FIG. 2 is not to be limited in scope to the elements depicted in FIG. 2 and may include fewer or additional elements than depicted in FIG. 2.

Figure 3:
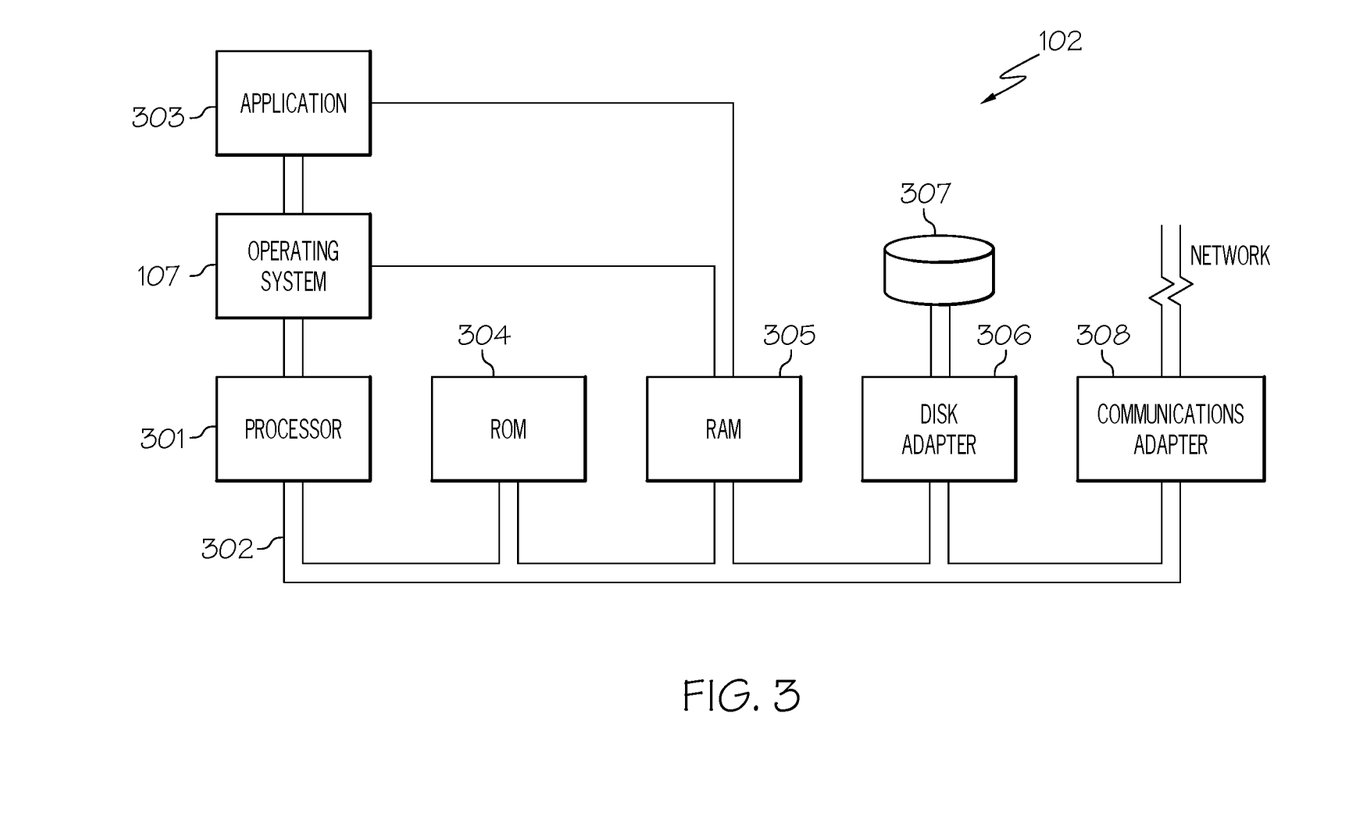

Referring now to FIG. 3 in conjunction with FIG. 1, FIG. 3 illustrates an embodiment of the present invention of a hardware configuration of memory manager 102 which is representative of a hardware environment for practicing the present invention. Referring to FIG. 3, memory manager 102 has a processor 301 coupled to various other components by system bus 302. An operating system 107 runs on processor 301 and provides control and coordinates the functions of the various components of FIG. 3. An application 303 in accordance with the principles of the present invention runs in conjunction with operating system 107 and provides calls to operating system 107 where the calls implement the various functions or services to be performed by application 303. Application 303 may include, for example, analytics engine 106 which is configured to optimize the memory management of computing devices 101 using the intelligent profiles consisting of patterns of execution sequences along with its associated memory footprint as discussed further below in connection with FIGS. 4-5.

Referring again to FIG. 3, read-only memory ("ROM") 304 is coupled to system bus 302 and includes a basic input/output system ("BIOS") that controls certain basic functions of memory manager 102. Random access memory ("RAM") 305 and disk adapter 306 are also coupled to system bus 302. It should be noted that software components including operating system 107 and application 303 may be loaded into RAM 305, which may be memory manager's 102 main memory for execution. Disk adapter 306 may be an integrated drive electronics ("IDE") adapter that communicates with a disk unit 307, e.g., disk drive.

Memory manager 102 further includes a communications adapter 308 coupled to bus 302. Communications adapter 308 interconnects bus 302 with an outside network (e.g., network 103 of FIG. 1) thereby allowing memory manager 102 to communicate with other devices, such as computing devices 101.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated in the Background section, in multitasking operating systems, processes (running programs) need a way to create new processes, e.g., to run other programs. Fork and its variants are typically the only way of doing so in Unix®-like systems. For a process ("parent process") to start the execution of a different program, it first forks to create a copy of itself. Then, the copy, called the "child process," calls the exec( ) system call to overlay itself with the other program thereby ceasing execution of its former program in favor of the other. The fork( ) operation creates a separate address space for the child. The child process has an exact copy of all the memory segments of the parent process. In modern Unix® variants, copy-on-write system calls are implemented and the physical memory need not be actually copied. Instead, virtual memory pages in both processes may refer to the same pages of physical memory until one of them writes to such a page: then it is copied. This optimization is important in the common case where the fork( ) operation is used in conjunction with the exec( ) operation to execute a new program: typically, the child process performs only a small set of actions before it ceases execution of its program in favor of the program to be started, and it requires very few, if any, of its parent's data structures. After the fork, both processes (parent and child) not only run the same program, but they resume execution as though both had called the system call. They can then inspect the call's return value to determine their status, child or parent, and act accordingly. In such operations, such as creating a new process as described above, the operating system may improperly invoke the out of memory manager in response to an out of memory error to terminate processes. However, many of these processes should not be terminated. In other words, in operations to create a new process as described above, the operating system may incorrectly determine that there is insufficient memory to satisfy the request. As a result, the operating system improperly invokes the out of memory manager to terminate processes, including those that should not be terminated, such as essential processes that are needed to run the operating system thereby causing instability or unusability of the computing device. There is currently not a means for effectively preventing the operating system from improperly invoking the out of memory manager when a system call is implemented, such as a fork( ) system call to create a new process that utilizes a copy-on-write system call.

Figure 4:
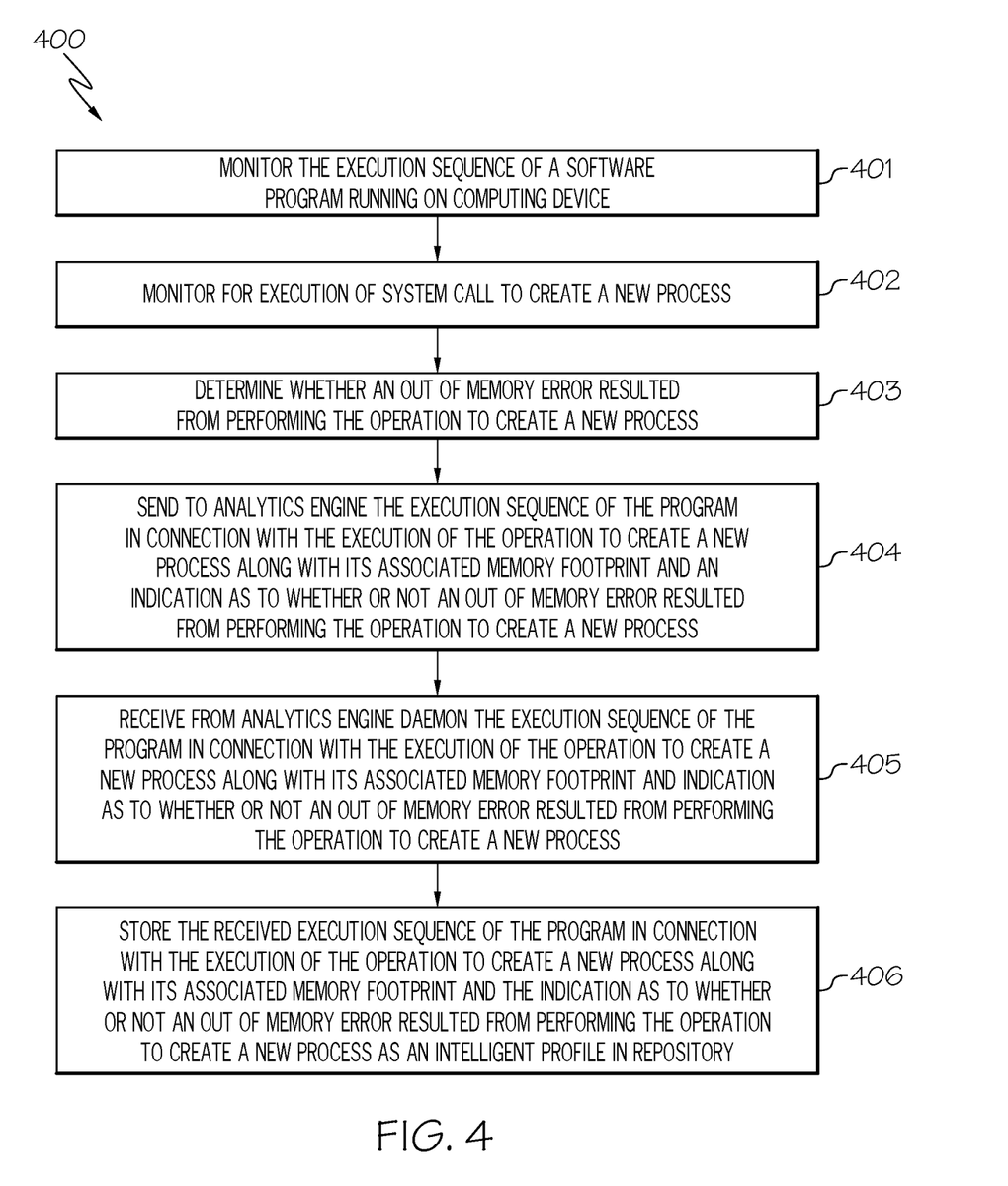
Figure 5:
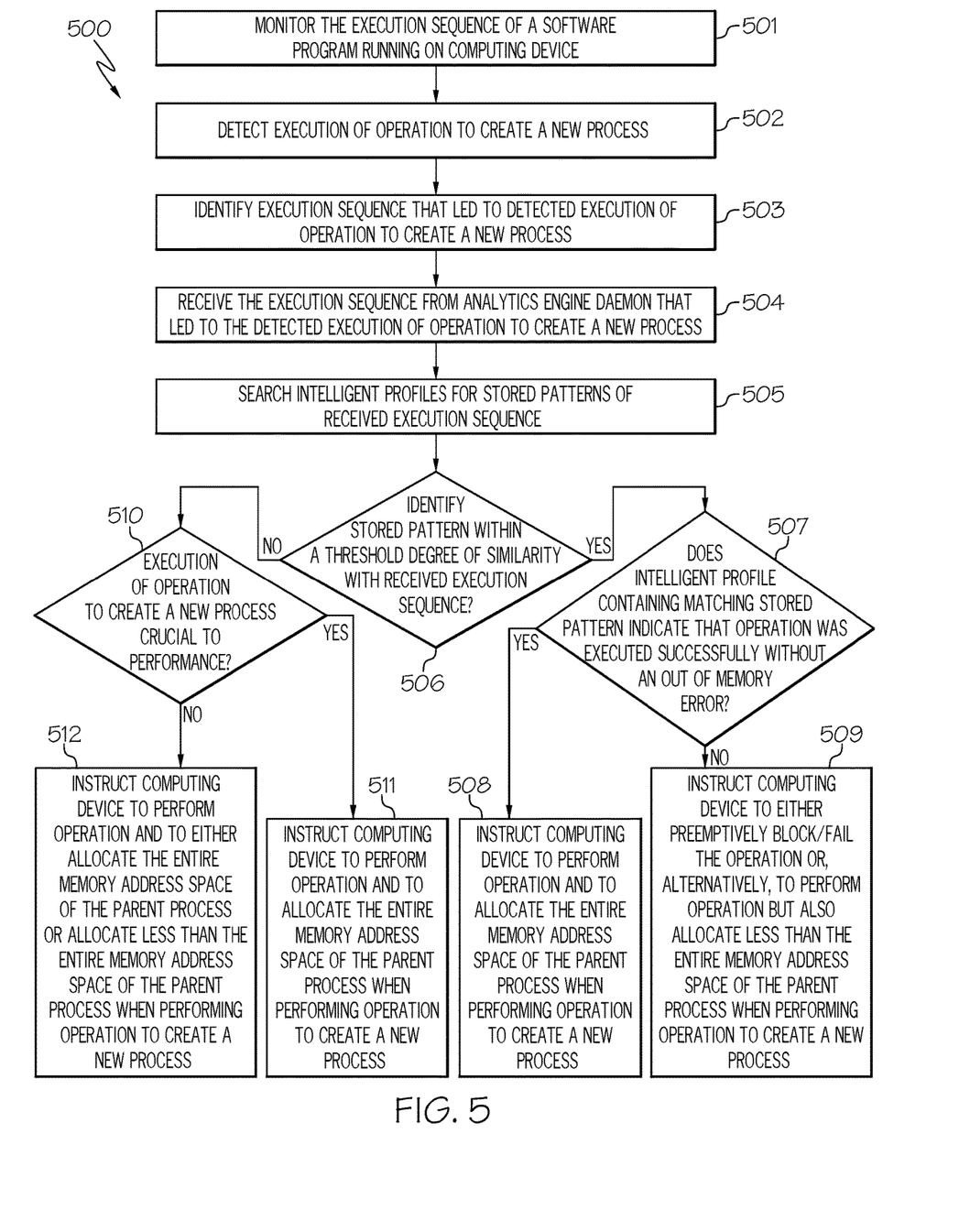

The principles of the present invention provide a means for addressing the operating system improperly invoking the out of memory manager in response to an out of memory error when a system call is implemented, such as a fork( ) system call to create a new process, by utilizing intelligent profiles based on different configurations predicting successful system calls (e.g., fork( ) system call to create a new process) as discussed below in connection with FIGS. 4-5. FIG. 4 is a flowchart of a method for building a repository of intelligent profiles consisting of patterns of execution sequences along with their associated memory footprints. FIG. 5 is a flowchart of a method for optimizing memory management using the intelligent profiles consisting of patterns of execution sequences along with their associated memory footprints.

As stated above, FIG. 4 is a flowchart of a method 400 for building a repository of intelligent profiles consisting of patterns of execution sequences along with their associated memory footprints in accordance with an embodiment of the present invention.

Referring to FIG. 4, in conjunction with FIG. 3, in step 401, analytics engine daemon 104 monitors the execution sequence of a software program running on computing device 101.

In step 402, analytics engine daemon 104 monitors for the execution of an operation, such as the operation to create a new process via the execution of the fork( ) system call that utilizes a copy-on-write system call.

In step 403, analytics engine daemon 104 determines whether an out of memory error resulted from performing the operation to create a new process.

In step 404, analytics engine daemon 104 sends to analytics engine 106 the execution sequence of the program in connection with the execution of the operation to create a new process along with its associated memory footprint (amount of memory that a program uses or references while running) and an indication as to whether or not an out of memory error resulted from performing the operation to create a new process.

In step 405, analytics engine 106 receives from analytics engine daemon 104 the execution sequence of the program in connection with the execution of the operation to create a new process along with its associated memory footprint (amount of memory that a program uses or references while running) and an indication as to whether or not an out of memory error resulted from performing the operation to create a new process.

In step 406, analytics engine 106 stores the received execution sequence of the program in connection with the execution of the operation to create a new process along with its associated memory footprint and the indication as to whether or not an out of memory error resulted from performing the operation to create a new process as an intelligent profile in repository 108.

These intelligent profiles consisting of patterns of execution sequences include the knowledge as to whether the executed operation to create a new process resulted in an out of memory error will be used by analytics engine 106 to perform intelligent memory management on computing devices 101 as discussed below in connection with FIG. 5. Such knowledge is being acquired from computing devices 101 and hence such "peer learning" is utilized by memory manager 102 to effectively manage memory in computing devices 101 so as to reduce the risk of operating system 105 of computing device 101 from improperly invoking the out of memory manager to terminate processes which should not be terminated in response to executing certain operations, such as the fork( ) system call to create a new process that utilizes the copy-on-write system call, as discussed below in connection with FIG. 5.

FIG. 5 is a flowchart of a method 500 for optimizing memory management using the intelligent profiles consisting of patterns of execution sequences along with their associated memory footprints.

Referring to FIG. 5, in conjunction with FIGS. 1-4, in step 501, analytics engine daemon 104 monitors the execution sequence of a software program running on computing device 101.

In step 502, analytics engine daemon 104 detects the execution of an operation to create a new process, such a system call that utilizes the copy-on-write system call. For example, a fork( ) system call may be executed to create a new process by creating a copy of itself.

In step 503, analytics engine daemon 104 identifies the execution sequence from the monitored execution sequence that led to the detected execution of the operation to create a new process.

In step 504, analytics engine 106 receives the execution sequence from analytics engine daemon 104 that led to the detected execution of the operation to create a new process.

In step 505, analytics engine 106 searches the intelligent profiles in repository 108 for stored patterns of the received execution sequence.

In step 506, a determination is made by analytics engine 106 as to whether there is a stored pattern within a threshold degree of similarity with the received execution sequence. A "stored pattern," as used herein, refers to an execution sequence that led to an execution of an operation (e.g., fork( ) system call that utilizes a copy-on-write system call). In one embodiment, natural language processing may be utilized for determining how closely an execution sequence matches one of the stored patterns in repository 108. In one embodiment, the threshold degree of similarity is user-specified. In one embodiment, the threshold degree of similarity refers to how similar the execution sequence in the received execution sequence is to the execution sequence in the stored patterns.

If there is a stored pattern that is within a threshold degree of similarity with the received execution sequence (referred to as a "matching stored pattern"), then, in step 507, a determination is made by analytics engine 106 as to whether the intelligent profile containing the matching stored pattern indicates that the operation (e.g., fork( ) system call that utilizes a copy-on-write system call) was executed successfully without an out of memory error.

If the intelligent profile indicates that the operation was executed successfully without an out of memory error, then, in step 508, analytics engine 106 instructs computing device 101 (e.g., analytics engine daemon 104) to perform the operation (e.g., fork( ) system call that utilizes a copy-on-write system call) and allocate the entire memory address space of the parent process when performing the operation to create a new process which involves copying the parent process. In such a situation, the intelligent profile indicates that the execution of such an operation is not known to cause an over allocation of memory. As a result, computing device 101 is instructed by analytics engine 106 to perform the operation (e.g., fork( ) system call that utilizes a copy-on-write system call) and to allocate the entire memory address space of the parent process when creating a new process.

If, however, the intelligent profile indicates that the operation was not executed successfully without an out of memory error, then, in step 509, analytics engine 106 instructs computing device 101 to either preemptively block/fail the operation or, alternatively, perform the operation but also allocate less than the entire memory address space of the parent process when creating a new process thereby lessening the risk in operating system 105 of computing device 101 from improperly invoking the out of memory manager to terminate processes which should not be terminated. By preemptively failing the operation, operating system 105 of computing device 101 is prevented from improperly invoking the out of memory manager to terminate processes which should not be terminated. Furthermore, by not allocating the entire memory address space of the parent process, memory is not being over committed. Processes that should not be terminated may not be terminated.

In one embodiment, analytics engine 106 determines the amount of memory address space of the parent process to be allocated based on the intelligent profiles. For example, the intelligent profiles maintain knowledge of whether operations were successfully executed without an out of memory error as discussed above in connection with FIG. 4. Some of these operations may then be known to execute unsuccessfully. That is, the execution of some operations may then be known to cause an over allocation of memory. However, those same operations may be able to be executed successfully without an out of memory error when a certain amount of memory address space of the parent process is allocated when performing the operation to create a new process. Such knowledge is also gathered by analytics engine 106 from analytics engine daemon 104 and stored in the intelligent profiles which may be used by analytics engine 106 as a guide to instruct computing device 101 (analytics engine daemon 104) as to how much less than the entire memory address space of the parent process should be allocated when performing the operation to create a new process.

If, however, there are no stored patterns that are within a threshold degree of similarity with the received execution sequence, then, in step 510, a determination is made by analytics engine 106 as to whether the execution of the operation to create a new process is crucial to the performance of computing device 101. For example, certain processes are critical and need to be running in order for the operating system (e.g., operating system 105) to operate correctly. If any of these critical processes are not operating, then the operating system may become unstable or unusable. Such a determination may be identified by analytics engine 106 by reviewing a list of processes that are deemed to be critical, which may be user-supplied. If the process to be created is listed within the list, then the operation to create such a process may be deemed to be crucial to the performance of computing device 101.

If the execution of the operation to create a new process is crucial to the performance of computing device 101, then, in step 511, analytics engine 106 instructs computing device 101 (e.g., analytics engine daemon 104) to perform the operation (e.g., fork( ) system call that utilizes a copy-on-write system call) and to allocate the entire memory address space of the parent process when creating a new process. Analytics engine daemon 104 will then inform analytics engine 106 regarding whether an out of memory error results as discussed above, such as in connection with FIG. 4.

If, however, the execution of the operation is not crucial to the performance of computing device 101, then, in step 512, in one embodiment, analytics engine 106 instructs computing device 101 (e.g., analytics engine daemon 104) to perform the operation (e.g., fork( ) system call that utilizes a copy-on-write system call) but to allocate less than the entire memory address space of the parent process when creating a new process thereby lessening the risk in operating system 105 of computing device 101 from improperly invoking the out of memory manager to terminate processes which should not be terminated. While the operation without a matching stored pattern may execute successfully without an out of memory error, analytics engine 106 may instruct computing device 101 to allocate less than the entire memory address space of the parent process out of an abundance of caution to ensure that memory is not being over committed. Analytics engine daemon 104 will then inform analytics engine 106 regarding whether an out of memory error results as discussed above, such as in connection with FIG. 4. In this manner, processes that should not be terminated may no longer be terminated. In one embodiment, analytics engine 106 may determine the amount of memory allocation based on similarly executed operations that were executed successfully with an allocation of less than the entire memory address space of the parent process. Such similarly executed operations may be determined based on the executed sequence being with a threshold degree of similarity (different threshold degree of similarity as in step 506) of a stored pattern.

Alternatively, in step 512, analytics engine 106 instructs computing device 101 (e.g., analytics engine daemon 104) to perform the operation (e.g., fork( ) system call that utilizes a copy-on-write system call) and to allocate the entire memory address space of the parent process when creating a new process. Analytics engine daemon 104 will then inform analytics engine 106 regarding whether an out of memory error results as discussed above, such as in connection with FIG. 4.

By utilizing the present invention, the functionality or capability of computing devices is improved by more effectively managing memory. Memory is no longer being over committed when processes are being created thereby preventing the termination of processes which could adversely affect the usability or stability of the computing device. For example, essential processes that are needed to run the operating system may not be terminated.

Furthermore, as discussed above, there is currently not a means for effectively preventing the operating system from improperly invoking the out of memory manager when a system call is implemented, such as a fork( ) system call to create a new process that utilizes a copy-on-write system call. The present invention provides a technological solution to this technical problem by utilizing intelligent profiles based on different configurations predicting successful system calls (e.g., fork( ) system call to create a new process). These intelligent profiles contain patterns of execution sequences along with its associated memory footprint and indications of whether an out of memory error resulted from the execution of the operation, such as the system call to create a new process. By utilizing these intelligent profiles, the analytics engine of the memory manager can instruct the analytics engine daemon of a computing device to allocate the appropriate amount of memory address space so that memory is not being over committed thereby preventing processes from being terminated that should not be terminated.

Furthermore, the present invention improves the technology or technical field involving process creation in multitasking operating systems. Currently, when a process is created, the process ("parent process") forks itself via a fork( ) system call to create a copy of itself. In such operations, the operating system may improperly invoke the out of memory manager in response to an out of memory error to terminate processes. However, many of these processes should not be terminated. In other words, in operations to create a new process as described above, the operating system may incorrectly determine that there is insufficient memory to satisfy the request. The present invention improves such technology by preventing the termination of such processes that should not be terminated. As discussed above, intelligent profiles are used by the analytics engine of the memory manager to instruct the analytics engine daemon of a computing device to allocate the appropriate amount of memory address space so that memory is not being over committed thereby preventing processes from being terminated that should not be terminated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for optimizing memory management, the method comprising:
   receiving an execution sequence that led to a detected execution of an operation to create a new process;
   searching profiles for a stored pattern with an execution sequence that is similar within a threshold degree of similarity as said received execution sequence, wherein said profiles contain patterns of execution sequences along with their associated memory footprints and indications of whether an out of memory error resulted from executing operations; and
   instructing a computing device to handle said operation to create said new process in a certain manner based on contents of a profile containing said stored pattern in response to identifying said stored pattern with an execution sequence within said threshold degree of similarity as said received execution sequence.

2. The method as recited in claim 1 further comprising:
   instructing said computing device to perform said operation and to allocate an entire memory address space of a parent process when performing said operation to create said new process in response to said profile indicating that said operation was executed successfully without an out of memory error.

3. The method as recited in claim 1 further comprising:
   instructing said computing device to preemptively fail said operation in response to said profile indicating that said operation was not executed successfully without an out of memory error.

4. The method as recited in claim 1 further comprising:
   instructing said computing device to perform said operation and to allocate less than an entire memory address space of a parent process when performing said operation to create said new process in response to said profile indicating that said operation was not executed successfully without an out of memory error.

5. The method as recited in claim 1 further comprising:
   instructing said computing device to perform said operation and to allocate an entire memory address space of a parent process when performing said operation to create said new process in response to not identifying said stored pattern with an execution sequence within said threshold degree of similarity as said received execution sequence;
   receiving an indication as to whether an out of memory error resulted from said computing device performing said operation to create said new process; and
   storing said indication and said received execution sequence in a profile.

6. The method as recited in claim 1 further comprising:
   instructing said computing device to perform said operation and to allocate less than an entire memory address space of a parent process when performing said operation to create said new process in response to not identifying said stored pattern with an execution sequence within said threshold degree of similarity as said received execution sequence;
   receiving an indication as to whether an out of memory error resulted from said computing device performing said operation to create said new process; and
   storing said indication and said received execution sequence in a profile.

7. The method as recited in claim 1, wherein said operation is a fork system call.

8. A computer program product for optimizing memory management, the computer program product comprising a computer readable storage medium having program code embodied therewith, the program code comprising the programming instructions for:
   receiving an execution sequence that led to a detected execution of an operation to create a new process;
   searching profiles for a stored pattern with an execution sequence that is similar within a threshold degree of similarity as said received execution sequence, wherein said profiles contain patterns of execution sequences along with their associated memory footprints and indications of whether an out of memory error resulted from executing operations; and instructing a computing device to handle said operation to create said new process in a certain manner based on contents of a profile containing said stored pattern in response to identifying said stored pattern with an execution sequence within said threshold degree of similarity as said received execution sequence.

9. The computer program product as recited in claim 8, wherein the program code further comprises the programming instructions for:

instructing said computing device to perform said operation and to allocate an entire memory address space of a parent process when performing said operation to create said new process in response to said profile indicating that said operation was executed successfully without an out of memory error.

10. The computer program product as recited in claim 8, wherein the program code further comprises the programming instructions for:

instructing said computing device to preemptively fail said operation in response to said profile indicating that said operation was not executed successfully without an out of memory error.

11. The computer program product as recited in claim 8, wherein the program code further comprises the programming instructions for:

instructing said computing device to perform said operation and to allocate less than an entire memory address space of a parent process when performing said operation to create said new process in response to said profile indicating that said operation was not executed successfully without an out of memory error.

12. The computer program product as recited in claim 8, wherein the program code further comprises the programming instructions for:

instructing said computing device to perform said operation and to allocate an entire memory address space of a parent process when performing said operation to create said new process in response to not identifying said stored pattern with an execution sequence within said threshold degree of similarity as said received execution sequence;

receiving an indication as to whether an out of memory error resulted from said computing device performing said operation to create said new process; and storing said indication and said received execution sequence in a profile.

13. The computer program product as recited in claim 8, wherein the program code further comprises the programming instructions for:

instructing said computing device to perform said operation and to allocate less than an entire memory address space of a parent process when performing said operation to create said new process in response to not identifying said stored pattern with an execution sequence within said threshold degree of similarity as said received execution sequence;

receiving an indication as to whether an out of memory error resulted from said computing device performing said operation to create said new process; and storing said indication and said received execution sequence in a profile.

14. The computer program product as recited in claim 8, wherein said operation is a fork system call.

15. A system, comprising:

a memory for storing a computer program for optimizing memory management; and a processor connected to said memory, wherein said processor is configured to execute the program instructions of the computer program comprising:

receiving an execution sequence that led to a detected execution of an operation to create a new process;

searching profiles for a stored pattern with an execution sequence that is similar within a threshold degree of similarity as said received execution sequence, wherein said profiles contain patterns of execution sequences along with their associated memory footprints and indications of whether an out of memory error resulted from executing operations; and instructing a computing device to handle said operation to create said new process in a certain manner based on contents of a profile containing said stored pattern in response to identifying said stored pattern with an execution sequence within said threshold degree of similarity as said received execution sequence.

16. The system as recited in claim 15, wherein the program instructions of the computer program further comprise:

instructing said computing device to perform said operation and to allocate an entire memory address space of a parent process when performing said operation to create said new process in response to said profile indicating that said operation was executed successfully without an out of memory error.

17. The system as recited in claim 15, wherein the program instructions of the computer program further comprise:

instructing said computing device to preemptively fail said operation in response to said profile indicating that said operation was not executed successfully without an out of memory error.

18. The system as recited in claim 15, wherein the program instructions of the computer program further comprise:

instructing said computing device to perform said operation and to allocate less than an entire memory address space of a parent process when performing said operation to create said new process in response to said profile indicating that said operation was not executed successfully without an out of memory error.

19. The system as recited in claim 15, wherein the program instructions of the computer program further comprise:

instructing said computing device to perform said operation and to allocate an entire memory address space of a parent process when performing said operation to create said new process in response to not identifying said stored pattern with an execution sequence within said threshold degree of similarity as said received execution sequence;

receiving an indication as to whether an out of memory error resulted from said computing device performing said operation to create said new process; and storing said indication and said received execution sequence in a profile.

20. The system as recited in claim 15, wherein the program instructions of the computer program further comprise:

instructing said computing device to perform said operation and to allocate less than an entire memory address space of a parent process when performing said operation to create said new process in response to not identifying said stored pattern with an execution sequence within said threshold degree of similarity as said received execution sequence;

receiving an indication as to whether an out of memory error resulted from said computing device performing said operation to create said new process; and storing said indication and said received execution sequence in a profile.

* * * * *